US 9,024,463 B2

(12) United States Patent
Boone (10) Patent No.: US 9,024,463 B2
(45) Date of Patent: May 5, 2015

(54) VERTICAL AXIS WIND TURBINE WITH MULTIPLE FLAP VANES

(76) Inventor: Daniel N. Boone, Indiana, PA (US)

(*) Notice: Subject to any disclaimer, the term of this patent is extended or adjusted under 35 U.S.C. 154(b) by 148 days.

(21) Appl. No.: 13/455,091

(22) Filed: Apr. 24, 2012

(65) Prior Publication Data
US 2012/0211992 A1     Aug. 23, 2012

Related U.S. Application Data

(63) Continuation-in-part of application No. 12/151,600, filed on May 8, 2008, now Pat. No. 8,164,210, and a continuation-in-part of application No. 11/715,143, filed on Mar. 7, 2007, now Pat. No. 7,696,635.

(51) Int. Cl.
| F03D 9/00 | (2006.01) |
| F03D 3/00 | (2006.01) |
| F03D 3/06 | (2006.01) |

(52) U.S. Cl.
CPC ............ *F03D 3/005* (2013.01); *F03D 3/067* (2013.01); *F03D 9/001* (2013.01); *F05B 2230/50* (2013.01); *F05B 2240/218* (2013.01); *F05B 2250/13* (2013.01); *F05B 2250/323* (2013.01); *Y02B 10/70* (2013.01); *Y02E 10/74* (2013.01); *Y02B 10/30* (2013.01); *Y02E 60/17* (2013.01)

(58) Field of Classification Search
CPC ..................................................... F03D 7/0232
USPC ............................................................ 290/55
See application file for complete search history.

(56) References Cited

U.S. PATENT DOCUMENTS

| 2,069,110 | A | * | 1/1937 | Naus ............................... 40/479 |
| 4,052,134 | A | * | 10/1977 | Rumsey ....................... 416/119 |
| 5,256,034 | A | * | 10/1993 | Sultzbaugh ..................... 416/91 |
| 8,164,210 | B2 | * | 4/2012 | Boone et al. .................... 290/55 |
| 2009/0180880 | A1 | * | 7/2009 | Ersoy ....................... 416/132 R |
| 2010/0233919 | A1 | * | 9/2010 | Ersoy ................................ 440/8 |
| 2011/0194938 | A1 | * | 8/2011 | Livingston ................ 416/132 B |
| 2012/0269627 | A1 | * | 10/2012 | Grahame ........................ 416/13 |
| 2013/0119672 | A1 | * | 5/2013 | Boone .............................. 290/55 |

* cited by examiner

*Primary Examiner* — Truc Nguyen
(74) *Attorney, Agent, or Firm* — Gary P. Topolosky (57) ABSTRACT

An improved wind turbine device with energy storage comprises a turbine rotor with rotatable vertical shaft, at least one bearing for said vertical shaft, and multiple rotor vanes disposed symmetrically for rotation about the vertical shaft. Each of said multiple rotor vanes is substantially box-shaped with four solid sides and a front and rear side disposed in a radial vertical plane. The front side to each vane is substantially open faced and the rear side has an opening covered by a plurality of flaps. Each of said flaps is capable of moving with the directional passage of wind through the vane.

12 Claims, 9 Drawing Sheets

VERTICAL AXIS WIND TURBINE WITH MULTIPLE FLAP VANES

CROSS-REFERENCE TO RELATED CASES

This application claims priority to co-pending U.S. application Ser. No. 12/151,600, filed on May 8, 2008, itself being a continuation-in-part of application Ser. No. 11/715,143, filed on Mar. 7, 2007, now U.S. Pat. No. 7,696,635, both disclosures of which are fully incorporated by reference herein.

FIELD OF THE INVENTION

This invention relates to the field of wind turbine devices, particularly those having a vertical axis of rotation. More particularly, the present invention relates to a Savonius-type, wind turbine device but one that is improved with multiple flap vanes.

BACKGROUND OF THE INVENTION

1. Current Standard Wind Power Generators (ERDA-NASA)

The contemporary "industry gold standard" for the wind generation of electricity is a propeller design with a directional mechanism to keep it facing the wind, sometimes called an ERDA-NASA design. Over time, a number of serious drawbacks and disadvantages of this design have emerged which imply that this design may not be the best way to meet the challenge of a rapidly accelerating demand for electrical power. These deficiencies include the following:

a. While thought to be more efficient than its known alternatives mostly because of its high "tip-speed ratio" (explained below), the ERDA-NASA design may not derive sufficient power from the wind to make it particularly cost-effective in the long run. It has been estimated that generating enough power for a single residential dwelling may require a propeller at least 25 feet in diameter. Other estimates suggest that very large diameter designs, from 125-200 feet, may be needed to achieve outputs in the 100 kilowatts-1000 kilowatts range. As size increases, production, installation, and maintenance costs rise very quickly. Also, given the higher stresses encountered with large, heavy units, failure rates rise making total replacement costs more likely. In addition, the efficient utilization of wind power by an ERDA-NASA unit requires supplementary control mechanisms for: turning (or orienting) the unit; feathering its blades; and overspeed braking in high winds. These control mechanisms use energy to operate—thus decreasing efficiency and further complicating design and production/maintenance costs. Units must be spaced apart roughly 10 times the rotor diameter to avoid turbulent interference with each other. Consequently, wind farms will occupy considerable acreage for a sizeable number of units. For example, one estimate requires 90 square miles for propellers 125 feet in diameter to produce 100 megawatts. Thus, for any proposed wind farm site, it remains a serious question whether ERDA-NASA units are economically feasible.

b. Safety considerations are also a factor. The higher tip speeds of today's propellers and greater dynamic strains and stresses on the materials used to make same all contribute to metal fatigue, increasing the risk of catastrophic failures. In addition, there are already abundant concerns about the detrimental effects on wildlife, especially birds and migratory fowl and raptors. ERDA-NASA units located near dwellings, or on the tops of tall buildings, also pose potentially serious hazards to human and animal life as well as to property. The tops of tall buildings are ideal sites for wind generators since wind speeds are proportionally greater at higher altitudes. In addition, the desire to develop "green" buildings gives ample motivation for incorporating rooftop wind generators into future architectural plans. Unfortunately, ERDA-NASA generators may not be the best answer because of safety issues alone.

c. ERDA-NASA units are not able to utilize wind power efficiently over a wide range of wind speeds. Current models of the ERDA-NASA wind turbines typically operate at a preferred constant wind speed of 40 rpm in a range between 6 and 60 mph. The propeller blades are feathered to prevent damage in high winds (i.e., above 60 mph). Consequently, there are significant energy losses at speeds in excess of 18 mph because the propeller blades feather to maintain a preferred constant rotation at 40 rpm. There are also significant energy losses at wind speeds less than 18 mph because generator changes (changes in load) must be made to keep that constant 40 rpm rotation. As wind speeds are highly variable, having such a narrow window of optimal wind velocities decreases expected efficiency.

d. High variation in wind speeds is not the only problem. The direction of wind current is itself in constant flux and unpredictable, especially in a small region over periods of great turbulence. Efficient wind turbines must be able to rapidly adjust to sudden directional changes over a full range, i.e., 360 degrees. Today's ERDA-NASA devices gradually reposition to take account of directional fluctuations, but by no means exhibit quick responsiveness to such directional changes.

e. Some wind generators have better applicability in smaller locations with lower electrical power demands. Individual dwellings, recreational vehicles, or marine uses may not readily accommodate smaller scale ERDA-NASA generators in terms of available physical space, safety and/or aesthetics.

Because of these disadvantages, alternatives to today's ERDA-NASA type generators should be sought for addressing the aforementioned problems.

2. Vertical-Axis Wind Turbines

Numerous patents have been granted in a category of wind turbines called "vertical-axis" turbines. These turbines are so-named because they have vanes or blades displayed outward from a vertically mounted, central axis, contrary to the horizontal axis of rotation for ERDA-NASA generators. The type of device installed on many home rooftops to improve attic air circulation is a good example of a vertical-axis turbine. An anemometer is another. An immediate advantage of such devices is that they need not be rotated to always face the wind. Whatever direction the wind comes from, these devices can immediately absorb wind energy and convert it to rotational power. Such devices are sometimes technically described as having their axis of rotation transverse to the flow of fluid medium.

Previous designs of vertical axis windmills generally fall into two categories, the Darrieus rotor and Savonius rotor types. Many variations of the two have been designed over the years.

Darrieus-type wind turbines—One category of vertical-axis wind turbines is based on the original Darrieus device (U.S. Pat. No. 1,835,018). A traditional Darrieus rotor is essentially two or more long thin blades with their ends connected at the top and bottom to a vertically rotating shaft. The cross-section of long blades has an airfoil shape, and this aerodynamic feature provides the transformation of wind flow energy into rotational energy. Since the original Darrieus design, numerous devices have attempted to utilize aerodynamic thrust as the driving force for wind turbines.

Darrieus-type turbines suffer from several disadvantages. Many, especially those closely based on the original, are not self-starting. They require an auxiliary power source to reach operational speeds. Darrieus turbines have an outside rotor speed of 4 to 6 times the wind speed. Thus, in winds of 25 mph, the exposed knife blade-like rotors will be traveling in excess of 100 mph. Such an arrangement is hardly "avian friendly," and indeed might pose extreme hazards to life and property. Moreover, efficiency of the original Darrieus design has been estimated to be only 30% to 40%. While alternative designs have meant to address some of these shortcomings, it is unlikely that any Darrieus-type design that depends on converting aerodynamic thrust to rotational energy will significantly improve these efficiency issues. The size of Darrieus-type turbines that could produce economically feasible capacities of electricity would have to be quite large posing other challenges to construction, cost-effectiveness and aesthetics.

Savonius-type wind turbines—The original Savonius wind turbine, as shown in U.S. Pat. No. 1,697,574, was essentially a pair of opposing concave vanes rotating around a central vertical axis. The classic Savonius rotors are open in the center and permit crossing fluid flow in an S-shape, past the inner edges of these rotating vanes. Later wind turbine designs have increased the number of vanes, attached vanes directly to the central shaft or other blades to prevent crossing fluid flow, and/or incorporated fixed vanes (or "stators") that do not rotate but serve to advantageously direct wind towards the rotating vanes. Some designs have added rotating housings that orient to the direction of wind for permiting wind flow only to those vanes presenting concave surfaces and deflecting wind away from the vanes returning upwind. These housings were meant to increase overall efficiencies. Still other designs have included complex mechanisms for rotating or modifying the vanes when moving toward the wind so as to reduce resistance and improve efficiency. All such innovations share one common essential with the original Savonius patent: they all depend on the fact that wind force applied to a rigid concave surface is greater than the same or lower wind force (or static wind resistance) applied to a physically connected, yet opposed rigid convex surface. This is evidenced in the operation of a simple anemometer. The concave cup surface facing the wind will capture more wind power than the other cups presenting their back convex surfaces causing the anemometer to rotate. As this is the essential energy transformation feature in all such designs, they will all be included in the category of "Savonius-type" designs for present discussion purposes.

Due to this common design feature, most Savonius-type devices share a major disadvantage of energy loss from "drag." Drag is the resistance resulting from moving a rigid surface against the wind or fluid medium. Because all of the vanes are surrounded by air when rotating, there is constant drag that resists their movement even against the convex backs of downwind vanes moving away from the wind. When vanes are moving upwind and presenting their rear convex surface to the wind, the effect of drag is amplified by the added applied force of the wind. The existence of drag considerably reduces the efficiency of this type of wind generator.

As noted above, ingenious devices have been designed to compensate for drag. These devices may incorporate "stators" (stationary vanes arranged symmetrically around the rotor) to: (a) funnel wind flow into the vanes moving downwind; and (b) deflect wind flow from vanes moving upwind. See, for example, U.S. Pat. No. 6,740,989. This can improve efficiency by decreasing the amplification effect of drag caused by wind forces acting on the vanes rotating upwind. Rotating housings that orient to the direction of the wind accomplish the same thing permitting wind flow only to the vanes moving downwind. See, for example, U.S. Pat. No. 6,126,385. However, these designs do nothing to eliminate or diminish the basic form of drag. Motion of the convex surfaces of the rigid rotating vanes against even stationary air in a stator- or housing-protected rotor still produces drag, thus decreasing efficiency. Further ingenuity has produced devices with complex mechanisms that decrease the surface area of vanes not moving downwind. See generally, U.S. Pat. Nos. 4,494,007 and 7,094,017. Notable among these are opening and closing "clam-shell" designs, which open to catch the wind in a downwind course before closing to present less surface area during the rest of the rotation. For example, see U.S. Pat. No. 6,682,302. Similar to these are the "sail-furling" devices with vanes made of sail cloth. They are intended to open downwind, but quickly furl or fold for the other part of rotation as per U.S. Pat. No. 6,655,916. See also, U.S. Pat. No. 5,642,983. These latter devices seem to effectively address the problem of drag, but at a cost. Rotational energy, or some other energy source, must be spent to operate these opening and closing mechanisms thereby compromising the efficiency of such devices. This is especially true when those devices add a wind direction sensor for synchronizing changes to the shapes of their vanes. It is doubtful that such complex drag-compensating innovations produce an overall increase in efficiency. Intuitively, it should require more energy to modify vane shapes by complex and/or synchronized mechanical means than would be gained through drag reduction. In any case, such complex mechanisms add greatly to manufacturing and maintenance costs in any commercial application.

Another serious disadvantage of the stator and protective-housing Savonius designs is the threat they pose to birds. The rotating vanes usually require minimal clearance between the edges of their stationary wind deflecting panels and vanes, creating a drastic sheering effect. From a bird's perspective, it would be as if someone had constructed a huge "meat grinder" in its path. See, for example, U.S. Pat. Nos. 5,380, 149, 6,740,989 and 6,849,964. A rotating housing design offers a less severe sheer factor, but can still trap birds in its rotor mechanism with little chance of passing through unscathed.

G. J. M. Darrieus, the inventor of the rotor discussed above, was among the first to note how the Savonius rotor suffers from a relatively lower, less efficient "tip speed ratio." At best, the furthest outside section (i.e., part of the rotor furthest from the vertical axis of rotation) for a Savonius device cannot exceed the speed of ambient wind flow. This means that they have a maximal tip speed ratio of 1:1 as compared to the ERDA-NASA or Darrieus rotor tip speed ratios of 3:1 or higher. Higher tip speed ratios and rotation speeds allegedly make the latter turbines more suitable for the efficient production of electricity. This serious deficit of the Savonius design, together with ther problems with drag, have been used to condemn such devices as impractical for purposes of serious power generation.

3. Gravity-flap, Savonius-type wind turbines

Compounding the above considerations produces a knock-down argument against Savonius-type turbines. However, recent innovations in two Savonius-type wind turbines make possible a design that may be able to address many of the above objections. The newer category makes use of large "flaps" held in a downward position by gravity to capture wind force. To be termed "gravity-flap Savonius wind turbines" in the present invention, they are shown and disclosed in U.S. Pat. No. 5,525,037 and Published U.S. Application No. 20040086373. The basic principle of these devices is that gravity and the force of the wind will cause a rectangular vane, hinged at the top, to naturally swing down. A frame or stopping mechanism blocks that vane from moving further when wind force pushes against the vane thereby providing a driving power to the rotor. This vane is made of lightweight material, however. When it rotates further so that its front face is no longer affected by the wind force, the vane is not blocked in that range of pivoting and can swivel up on its hinge to permit air to flow through. When the vane encounters air resistance on its rear surface, it pivots up and allows air or wind to pass by unimpeded. This greatly reduces drag resistance even in static air. When the vane travels through the upwind cycle, the wind force acting on it can raise the vane even further, allowing more wind to spill through and further increasing turbine efficiency.

The latter published U.S. application has intuited something important about wind power. It includes a detailed assessment of the amount of wind force that may be captured and converted to torque at the axis-hub. Using reasonable estimates and calculations, this inventor opines that "incredible forces" may be generated by such a device and the "leverage principle" it incorporates. What is lacking beyond one brief reference to how much horsepower an ERDA-NASA generator requires to produce a certain amount of electricity, however, is a detailed comparison to see how that prior art gravity-flap Savonius design stacks up against a comparable ERDA-NASA turbine. The omission of such a comparison is understandable since it is hard to see on what basis the two can be compared.

Many Savonius-type devices have been invented, all flying in the face of traditional considerations of efficiency that condemn them as immediately stillborn. Hence, the question arises why there has been such stubborn persistence in improving such devices. A possible answer is that most Savonius-type inventors have shared the same belief that, in some way, Savonius-type wind turbines more successfully extract wind energy than their Darrieus or horizontal-axis turbine counterparts. The question remains whether this bare, unexpressed intuition can be articulated in such a manner to show that it is not only plausible, but true.

4. Wind Energy Extraction-Effectiveness vs. Efficiency

Some effort along these lines will now be made to conceptualize a basis for an energy-extraction comparison of Savonius-type wind turbines with horizontal-axis, particularly ERDA-NASA, wind turbines. This will take the form of a thought experiment.

Suppose we are considering an arbitrarily selected vertical square plane 100 ft.×100 ft., aligned transverse to the wind. The area of this hypothetical square area is 10,000 sq. ft. The amount of wind force varies according to altitude, drag coefficient, wind velocity squared, and surface area impacted. If we assume a sea level application with the value 0.0034, a drag coefficient of 1.5, and a wind velocity of 10 knots, the force of the wind over the 10,000 sq. ft. area is:

$$F_w=0.0034\times1.5\times(10)^2\times10,000=5100 \text{ pounds of wind force.}$$

Given an ideal wind turbine in some possible world, all 5100 pounds would be capturable and translated into rotational energy. Of course, such a turbine cannot exist in our world. At best, any real Savonius-type vertical-axis turbine can present no more than 50% of its transverse plane surface to the wind as a "working" surface—i.e., a surface capable of extracting wind energy. And only the surfaces of rotor vanes moving downwind (roughly half of the vanes employed) will capture wind energy. In practice, given the need for vane clearances and other structures, this capture area will be much less than 50%. So, let us suppose we construct a hypothetical Savonius-type turbine for the 100 ft.×100 ft. square that presents only 35% of its surface in the square as a "capture" area. That is, only 35% of the total 10,000 sq. ft. area consists of downwind moving vane surface area capable of extracting wind energy. Then, even if the working surfaces were 100% efficient, the maximum wind force the turbine could capture in principle would be 35% of 5100 pounds, or 1785 pounds. In practice, vertical axis turbines are thought to be very inefficient. "Efficiency" is here defined in the standard way: how much total wind energy impacting the turbine's working surfaces gets transformed into rotational energy. Let us suppose our hypothetical Savonius-type wind turbine makes a poor showing in this regard and is only 20% efficient. It will only capture 20% of the 1785 pounds impacting its vane surfaces for a final total of 357 pounds. Out of a total possible of 5100 pounds striking the 10,000 sq. ft. area, the hypothetical turbine extracts only 357 pounds or 7% total. So far, that doesn't sound promising.

How does it compare with an ERDA-NASA propeller turbine? First, let us ask the more specific question: "How large a propeller would we need in an ERDA-NASA turbine to capture the same amount of wind force, 357 pounds?" Assume we have a turbine with an unrealistically high efficiency rating of 80%. To then capture 357 pounds of wind force, the propeller would need a total working or capture surface area of 357/0.80=446.25 sq. ft. There are three blades to each propeller, so the capture surface area of each propeller would be 446.25/3=148.75 sq. ft. Making the comparison work even more favorably to the ERDA-NASA unit, let us assume that the three propeller blades are not feathered and that each blade has an overall average width of 2 ft. In that case, each blade is a little over 74 ft. long. At this point, we encounter a serious conceptual problem with the initial attempt at comparison. The blade is approximately the radius of a circular area swept by the propeller. So, if a propeller has a radius of 74 ft., the circular area it sweeps out is around 17,203 sq. ft. Unfortunately, that is a much larger area than the hypothetical 10,000 sq. ft. we're assuming for the comparison basis. The conclusion we are driven to given initial assumptions is that one cannot possibly construct an ERDA-NASA propeller capable of extracting the same amount of energy as the hypothetical Savonius-type turbine in any given area transverse to the wind.

Is it possible to manipulate the figures even more favorable to an ERDA-NASA propeller for achieving some basis of comparison? To cut to the chase, let us first calculate what maximum size ERDA-NASA propeller could be fit into a 10,000 sq. ft. area. Neglecting the need for a supporting tower or any other structures or components (such as the central hub), a 10,000 sq. ft. circular area has a radius of approximately 56.42 ft. Assume then, that each propeller blade has a length of 56.5 ft. Furthermore, let's give each such propeller an (unrealistic) efficiency rating of 90%. Then, to capture the same 357 pounds of wind force, the working surface area of the propeller would need to be 357/0.90=396 sq. ft. Each of the three blades would, therefore, need to have a surface area of 396/3=132 sq. ft. For a surface area of 132 sq. ft. from a propeller blade 56.5 ft. in length, the average width of each blade would need to be 2.34 ft. and completely unfeathered at all wind speeds. These proportions are at least feasible, even if the other conditions are not. Thus, if we make a comparison with ERDA-NASA wind turbines based on several unrealistic assumptions in their favor, it would still seem to require ERDA-NASA propeller blades almost 60 ft. in length and roughly 2.34 ft. in average width, much wider than normal for this kind of generator.

For another, more realistic comparison, let us suppose that a Savonius-type wind turbine actually presents 40% of its surfaces as wind energy capturing surfaces, a percentage that seems easily achievable. Further, suppose that the hypothetical generator is capable of achieving 30% efficiency. Under these still modest assumptions, the total wind energy extracted would be 5100 pounds×40%×30% or 612 total pounds. Further suppose that the ERDA-NASA turbine efficiency is a more realistic (but still generous) 60%. In that case, the working surface area of the propeller, to capture the identical 612 pounds, would need to be 612/0.60=1,020 sq. ft. Each of the three blades would have an area of 1,020/3=340 sq. ft. As it is unrealistic to assume that these propellers have no support structure, let's suppose at least 20% (or 2,000 sq. ft., a still modest estimate) of the total 10,000 sq. ft. transverse area of the turbine is committed to area occupied by the support tower and/or other auxiliary structures. Then, a propeller swept, circular area of 8,000 sq. ft. would need a radius of approximately 50.5 ft. Assuming this as the maximum blade length and given the single blade area of 340 sq. ft., each blade would then have an average width of almost 7 ft., always unfeathered, all of which is absurd given today's conventional ERDA-NASA designs.

What the above comparison illustrates is that the current designs of ERDA-NASA wind turbines, with their relatively narrow, tapered, and often feathered blades, cannot hope to present sufficient energy-capturing surfaces to the wind to compete with Savonius-type turbines. ERDA-NASA turbines would need to undergo significant redesign, greatly increasing blade area through much wider blades, in order to compete with the wind energy extraction capabilities of known Savonius-type turbines. The essential point is that while the aerodynamic properties of ERDA-NASA turbines permit them to achieve higher tip-speed ratios, they do so only after sacrificing a vast amount of available wind energy that flows through their rotors untapped. Savonius-type wind turbines present a far greater surface area—a differential of several magnitude—for wind energy capture than ERDA-NASA wind turbines of any reasonably comparable size. The implication of this disparity in wind energy capture potential is that even less efficient Savonius-type turbines will always beat out highly efficient ERDA-NASA turbines in terms of total wind energy harnessed. This startling comparison suggests that methods of wind generator choice need to consider more than claimed efficiency ratings. Perhaps a new rating along the lines of "effectiveness of fluid energy extraction" would be more suitable. Efficiency of a device, as typically calculated, is only one measure of the effective transference of available wind energy into rotational mechanical energy. In terms of the generation of electrical or pumping energy, it may be the least important. Given that Savonius-type generators could capture more energy than ERDA-NASA generators, easily by a factor of 10, then even the loss of some of that energy through transmission devices to yield higher rotational speeds (thus compensating for lower tip-speed ratios) would still produce greater quantities of electricity.

Gravity-flap Savonius turbines designed with the 40% minimum working surface of the hypothetical example and with the flap mechanism, purport to yield higher efficiencies than the assumed 30%. Thus, in terms of the effective and efficient capture of wind energy, this type of turbine could be highly superior to ERDA-NASA turbines in principle. The ultimate goal in the wind generation of power should be to harvest the maximum possible wind energy available in a given three-dimensional space containing wind flow. ERDA-NASA turbines are simply not designed with that objective in mind.

Unfortunately, the two gravity-flap turbines discussed above, U.S. Pat. No. 5,525,037 and Published Application No. 20040086373, suffer from a feature that makes them seriously less efficient in capturing wind energy. The main problem with their design is that their gravity-flap vanes are exposed, flat planes. Significant amounts of wind force striking the surface can flow laterally off the vane and past their vane edges. Only a small portion of the wind energy available in striking the vanes would be captured by such designs in contrast with a standard "cup" design which limits lateral wind flow. The assumption made by inventors of those devices is that wind forces impacting their respective vanes will strike them with full force and be fully captured. In reality, as in any fluid flow system, blocked vanes will only serve as an obstacle causing a diversion of flow around them. The diverted fluid flow will carry away with it much of the contained fluid flow energy. Thus, instead of the high energy-capturing efficiency assumed by the inventors of these gravity-flap devices, the more realistic expectation should be that the devices will have energy-capturing efficiencies that are much lower. Only if one can trap the fluid flow and prevent lateral flow around the vane can one hope to have significant proportions of the fluid energy transferred into a catchment vane.

Downwind moving, Savonius-type vanes provide means for trapping fluid flow energy and more effectively capturing the wind energy impinging on their concave working surfaces. The wind cannot readily flow sideways but must deliver more of its energy into the vane surface. The concave surfaces of a Savonius-type vane prevent the easy lateral flow of wind around them. Roughly, the more concave the surface, the more energy that is not lost to lateral flow and instead gets transferred into the vanes as rotational energy. Of course, as seen above, Savonius-type turbines with rigid rotor vanes suffer from drag resistance on all but the downwind part of the cycle (and perhaps even there in principle). There is thus a need for a wind turbine able to capture wind energy as effectively as a Savonius-type wind turbine, with concave surfaces restricting lateral flow, which can achieve greater efficiency by use of a gravity-flap system for overcoming drag resistance.

SUMMARY OF THE INVENTION

The initial patent combined a Savonius-type design with a gravity-flap design for harnessing wind energy effectively and efficiently using a plurality of roughly rectangularly shaped "cup" vanes which more closely resembled "boxes" than "cups." Each vane had an open side in a vertical plane disposed radially outward from the central vertical axis of rotation and a gravity-flap mounted on its flat rear surface. These rectangular "box" vanes connected to the central vertical axis around which they all rotated. That gravity-flap could be made of any lightweight material, such as aluminum sheet or reinforced fabric stretched over a light frame. That flap was preferably hinged at the top so as to quickly and easily swivel up and down inside the box. The rear surface of each rectangular vane was left open so that wind would flow through when the flap was open.

In operation, wind would flow and be very effectively captured by those rectangular box vanes when opened to the direction of the wind. The flap in the rear of each vane was slightly larger than the rear opening and would be forced closed over the rear opening preventing wind from flowing through. Thus, the force of the wind moved the vane, producing torque in the vertical axis. When that vane has rotated so that it was no longer open to the wind, it would begin to experience drag resistance from ambient air and wind forces on the rear of the box vane when moving upwind. At those periods in the rotation, the force of the wind or resisting air would cause the flap to open and allow ambient air (or wind) to pass through, greatly decreasing the resistance from these sources and improving the efficiency of the turbine.

The present invention is a further improvement. It comprises an improved wind turbine device with energy storage, said device comprising a turbine rotor with a rotatable vertical shaft, at least one bearing for said vertical shaft, and multiple rotor vanes disposed symmetrically for rotation about the vertical shaft. Each of said multiple rotor vanes is substantially box-shaped with four solid sides and a front and rear side disposed in a radial vertical plane. The front side to each vane is substantially open faced and the rear side has an opening covered by a plurality of flaps, each of said flaps being capable of moving with a directional passage of wind through the rotor vane.

Objects of the Invention

It was an object of the first patent to provide a wind turbine that: (a) captures wind energy more effectively and efficiently (as defined above) than other vertical- or horizontal-axis wind turbines; and (b) converts that energy into rotational energy for running an electrical generator. The turbine was simple in design, durable even in extreme wind speeds, with almost no moving parts and therefore, cost-effective to build and maintain. In addition, the wind turbine of that invention was self-starting. It would accommodate winds omni-directionally from a full 360 degrees without the need for stator blades, stationary or rotating housings to funnel wind, or any other mechanism for favorably orienting the turbine toward the wind.

A further object of that patent provided a wind turbine that is safe to its operating personnel, property, birds and wildlife. This is accomplished by embodiments in which the rotor vanes do not exceed a tip speed ratio of one-to-one for safer operating speeds and greater visibility (i.e., no "motion smear" from fast-moving blades). While the first patent is more compact than ERDA-NASA turbines, its vanes are relatively larger and more visible. Preferred embodiments used light-weight materials with blunt edges and rounded surfaces to better cushion potential impacts, without any sharp, fast-moving blades, thin cables, or other parts that otherwise pose safety hazards. It was even feasible to spray coat surfaces with rubberized foam to lessen damage from any contact with moving vanes.

It was another object of the first patent to provide a wind turbine that was "stackable." Multiple units may be placed vertically above one another in a suitable framework to increase the amount, and effectiveness, of wind energy capture by harnessing more wind flow at higher elevations. The patent showed a turbine design that was/is "scalable": from very large units suitable for the commercial production of electrical power, to moderate-sized units for use in rural dwellings, recreational settings and marine applications, to very small folding, portable units suitable for extended duration backpacking or mountain climbing uses. Also, the patent provided a wind turbine readily adaptable to running a water pump instead of an electrical generator. With its safe, compact design, that first invention was suitable for operating on the tops of tall buildings.

A principal object of the present invention supplements previous, related versions by providing vanes with multiple flaps. By adding multiple flaps to each rotating vane, this invention will be lighter in weight and cheaper to build bigger boxes having no "sides" filling in the vane middles. As such, a multiple vaned arrangement should be more efficient than to stack a bunch of smaller, shorter "singles", or single-boxed vanes one atop another. In the accompanying FIG. 10, a representative multiple vane arrangement, with four flaps per vane, is shown. It is to be understood, however, that two- or three-flapped vanes are intended hereby as are vane configurations with five or more flaps per vane/"box".

DESCRIPTION OF PREFERRED EMBODIMENTS

Figure 1:
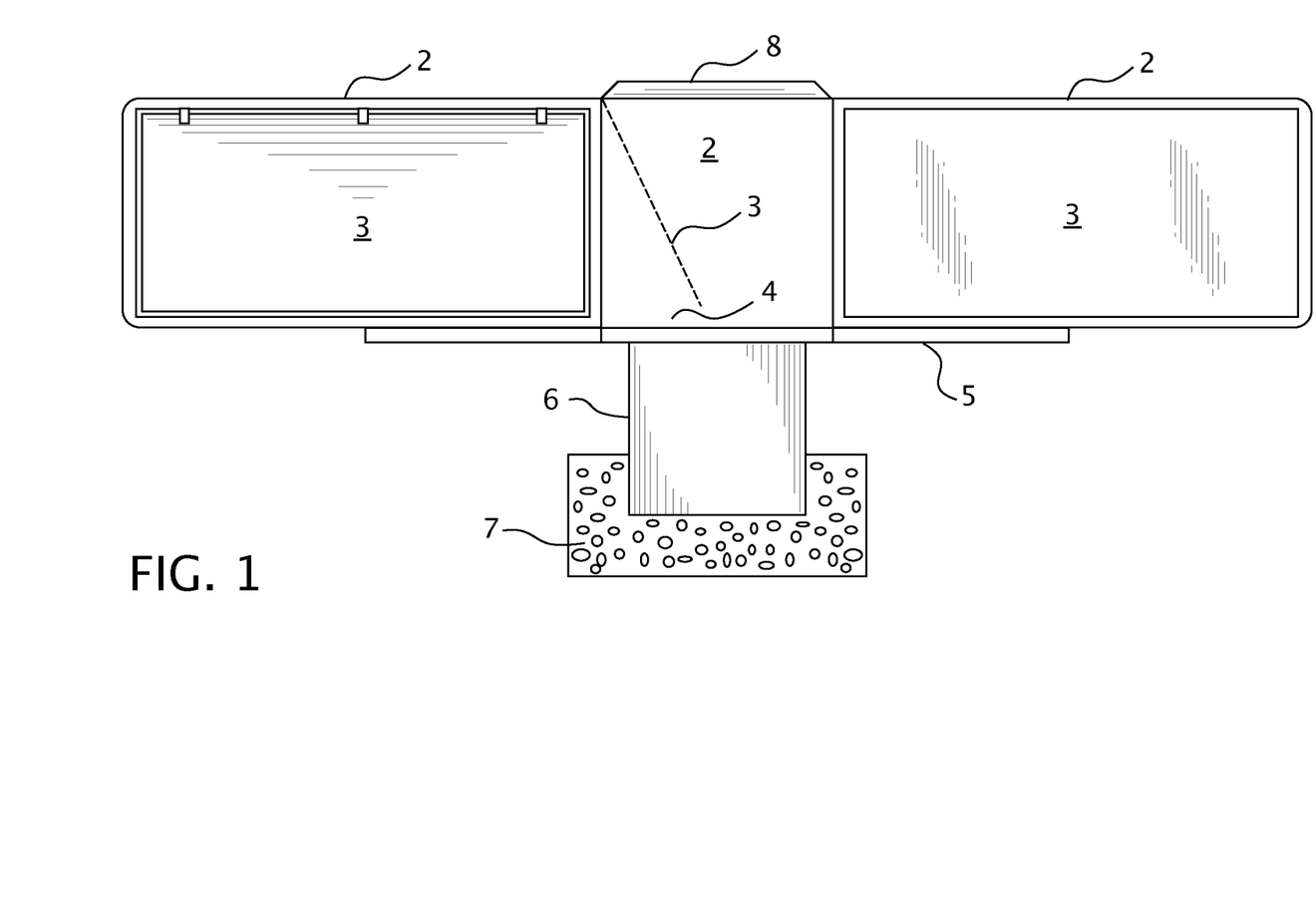
FIG. 1 is a front view, ground level schematic showing three of four wind catchment vanes according to one preferred embodiment of the parent invention.

Referring to FIG. 1, there is shown a front view, ground level schematic with three of four wind catchment vanes 2. The fourth vane would be obscured in this view and would be otherwise located behind the vane depicted in the middle of FIG. 1. At the rear of each box-shaped vane is a gravity-flap 3. The middle vane exhibits its gravity-flap as a partially open, dotted line 4. Each vane is connected at the bottom to a cross-shaped support base 5. That, in turn, connects to an electrical generator 6 set in a steady immovable base 7. A cap 8 covers the cubical space in the center of the four vanes of this embodiment attached to the upper inside corner of each vane.

In this embodiment, the front side of each vane 2 is open. The rectangular rear surface of the box-like vane is almost completely open except for a narrow flap support rim. Each vane rear opening is covered by a flap, slightly larger than the opening and normally held down by gravity. Whatever the wind direction, wind force will enter a vane presenting its larger open side upwind keeping the gravity-flap 3 closed for that vane. The box-like shape of each vane will funnel wind forces towards that gravity-flap and prevent lateral escape of the wind. This will transfer wind force into rotational movement of the rotor on which the vanes are mounted. However, for the other three vanes which do not present their open sides upwind, there will be air resistance (drag) or wind forces from the wind acting on the rear closed surfaces of each. This will cause the gravity-flaps to open, permitting air or wind to flow through the openings, as is somewhat indicated by the dotted line 4 in middle vane. The cross-shaped support base 5 is constructed of suitable material, strength and attachment design to support the vanes adequately even in extreme winds. Each vane is constructed of sufficiently reinforced materials to withstand such conditions. The support base 5 rotates freely about its vertical axis of rotation. The support base 5 connects to the shaft of an electrical generator 6 set in a steady, immovable base 7.

Figure 2:
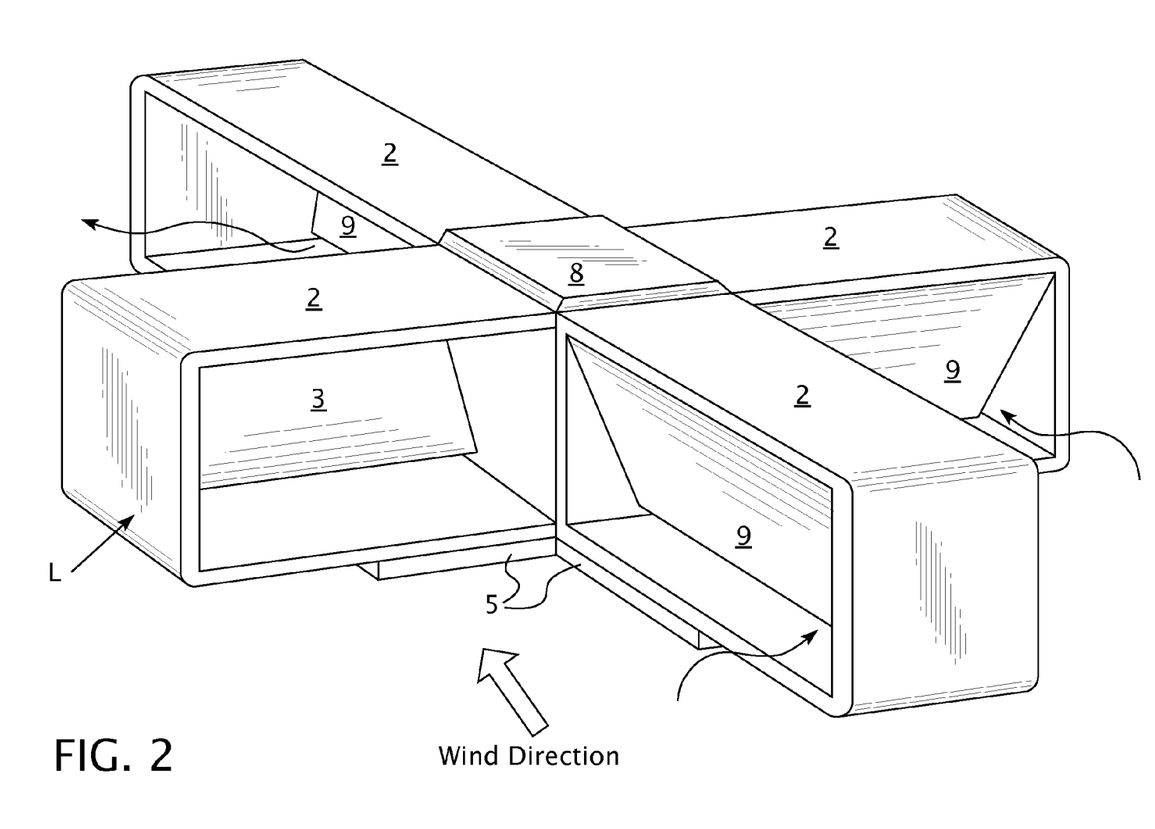
FIG. 2 is a perspective schematic showing the four vanes and support structure from FIG. 1, along with the direction of wind flow against same.

FIG. 2 is a perspective schematic that shows in three dimensions four vanes 2 on support structure 5. An arrow indicates the direction of wind flow against a closed gravity-flap 4 and through openings created by partially raised gravity-flaps 9. The sides to the vane funnel the wind and prevent it from easily escaping laterally. This allows the closed gravity-flap 3 and vane structure to absorb wind energy which then transforms into rotational motion. Air and wind resistance on the rear surfaces of the other three vanes raise gravity-flaps 9 and permit air flow through the rear openings in the vanes. This decreases drag or air/wind resistance on the rear surfaces of these vanes, thus increasing efficiency. Note, the leftmost vane L has inside lines drawn for the closest flap to that vane.

Figure 3A:
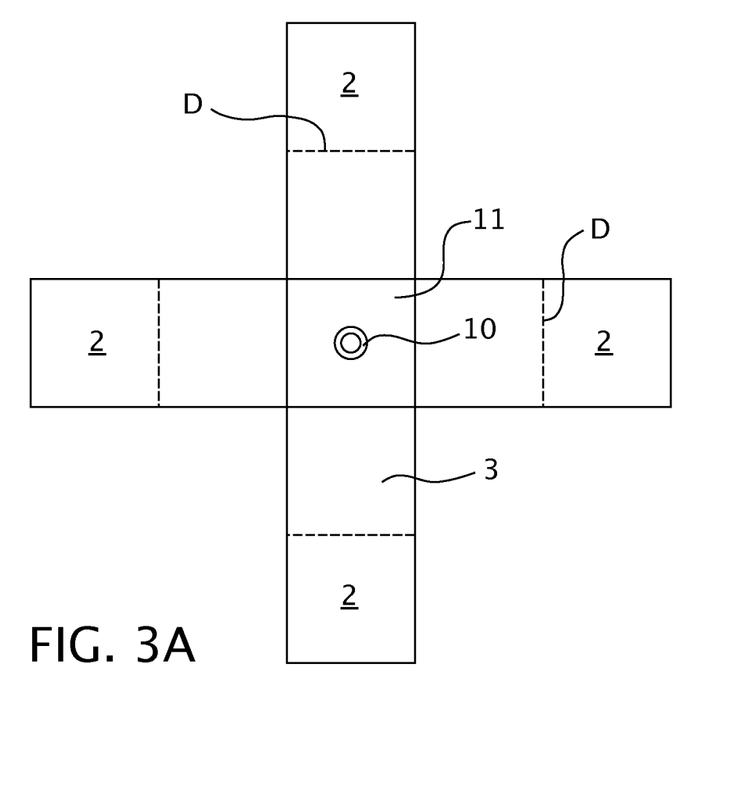
FIG. 3A is a top view schematic of the device in FIG. 2, the dotted lines below each vane indicating the cross-shaped support located therebeneath.
Figure 3B:
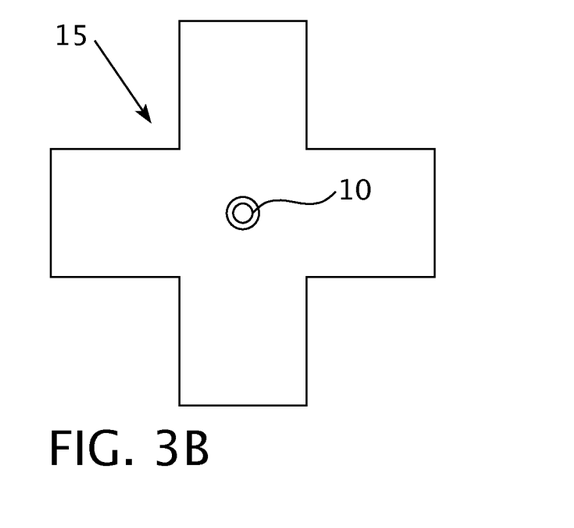
FIG. 3B is a top view schematic of the cross-shaped support and central rotating vertical axis with the four vanes removed.

FIG. 3A is a schematic view from above a device having four vanes 2 disposed symmetrically about central rotating, vertical axis 10. FIG. 3B shows the cross-shaped support structure 15 on which the four vanes depend. The placement of that support is indicated in FIG. 3A by dotted lines below each vane 2. The cap is removed in this view to reveal a cubical space 11 created by joining the inside corners of each vane. While the drawing exhibits four opposed vanes, there could be alternative embodiments with three or five vanes with relevant adjustments in support structures. Further research with otherwise identical prototypes is necessary to determine if there are any gains in effectiveness and efficiency as discussed above.

Figure 4:
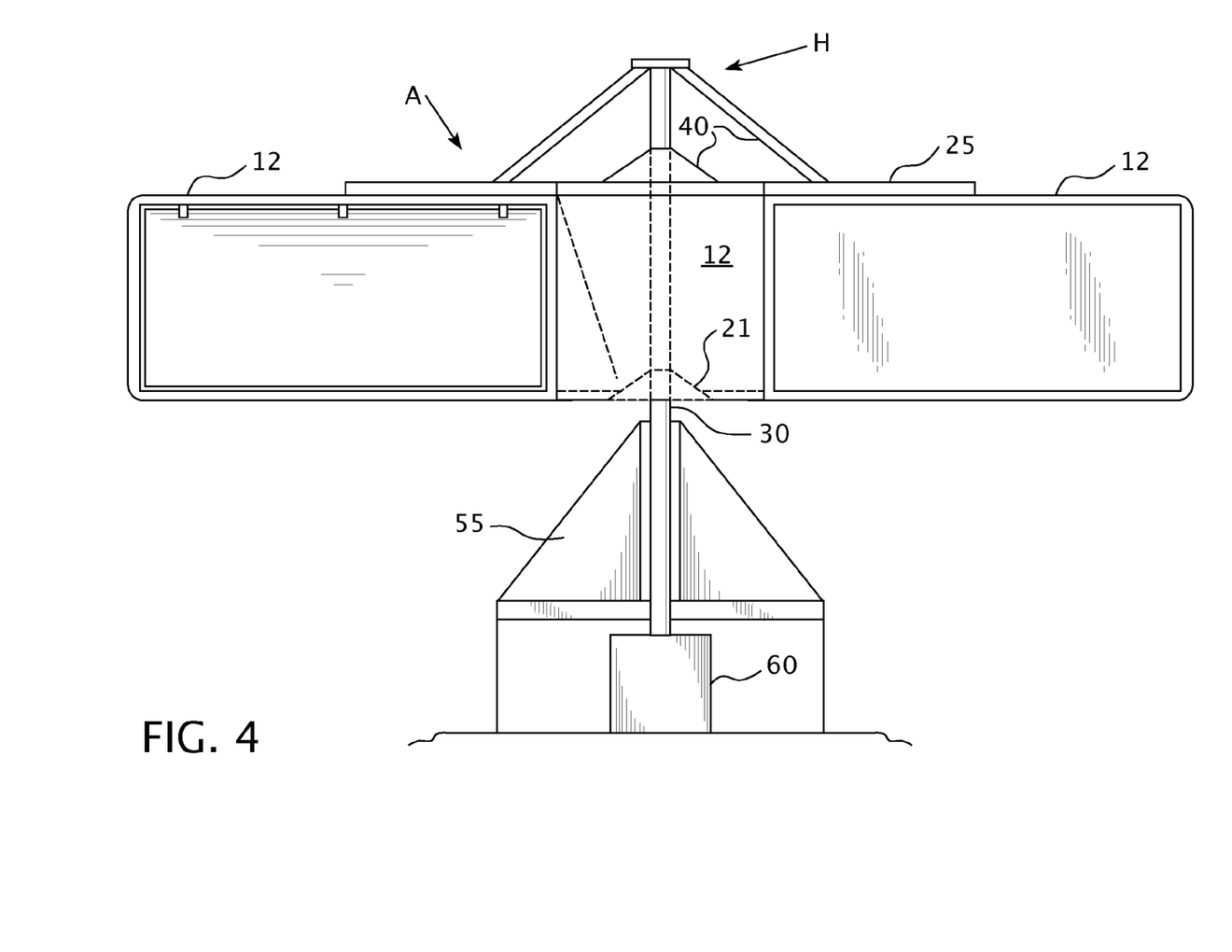
FIG. 4 is a front view, ground level schematic showing a first alternative embodiment of the parent invention in which the vanes (only three are shown) connect to a cross-shaped support above.

FIG. 4 is a front view, ground level schematic showing a first alternative embodiment in which the vanes 12 (only three shown) are connected to a cross-shaped support 25 above, the central hub H of which securely fastens to an elongated vertical shaft 30. Additional attachments with supporting struts 40 are shown at the top of assembly A and at the bottom of cubicle space 21 inside the four vanes. The vertical shaft is partially enclosed at its base in a housing 55 which it rotates freely. That shaft 30 continues through the base to turn an electrical generator or water pump 60. This embodiment may be more suitable for large units in commercial wind farm installations. Also see the discussion of FIG. 12 below.

Figure 5:
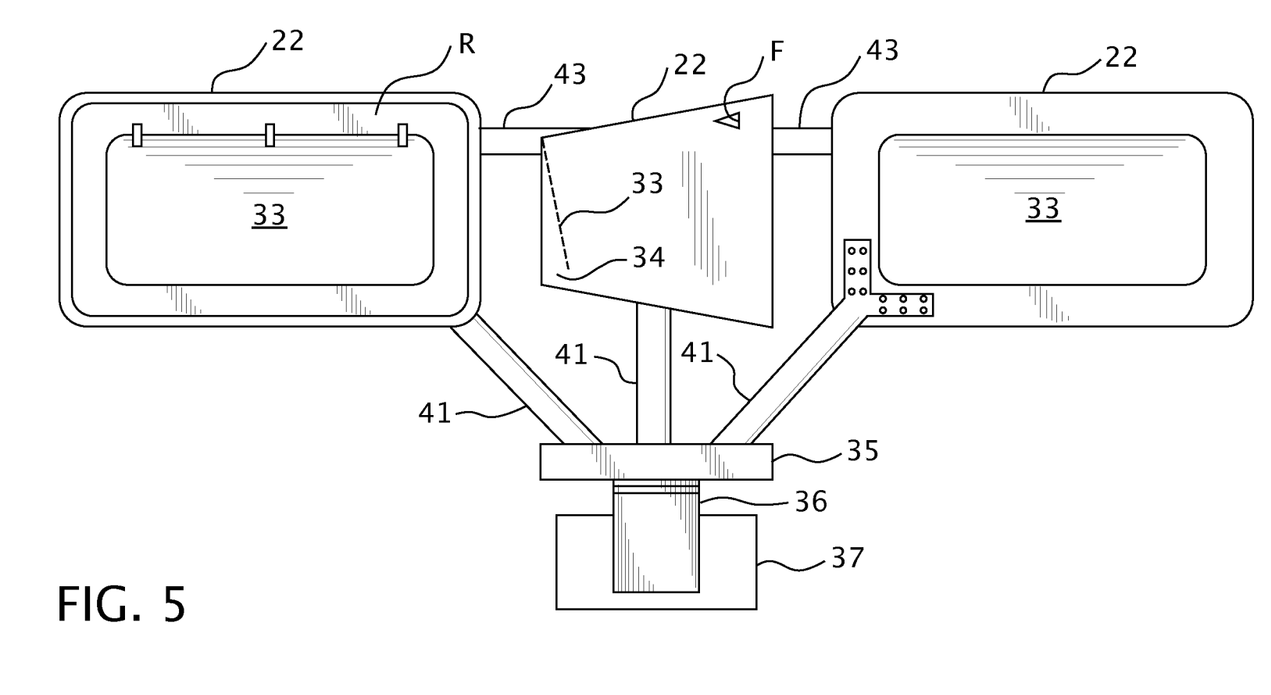
FIG. 5 is a front view, ground level schematic showing a second alternative embodiment of the parent invention having vanes that are more funnel-shaped and taper from an open front to a smaller rear face for allowing possible wind flow through the center and between opposing vanes.

FIG. 5 is a front view, ground level schematic showing a second alternative embodiment. Therein, three of the four wind catchment vanes 22 shown are more funnel-shaped, tapering from the open front F to the smaller rear face R. Also, wind flow is possible through the center of the apparatus between opposing vanes. At the narrower rear of each rectangular shaped vane is a gravity-flap 33. The middle vane exhibits the gravity-flap as a partially open dotted line 34. Each vane is connected by a supporting arm 41 to a round disk structure 35 that connects to a secured electrical generator 36 set in a steady, immovable base 37. The round disk structure 35 rotates freely about its vertical axis of rotation. Also depicted are support struts 43 attached to the tops of and crossing diagonally between opposed vanes.

Figure 6:
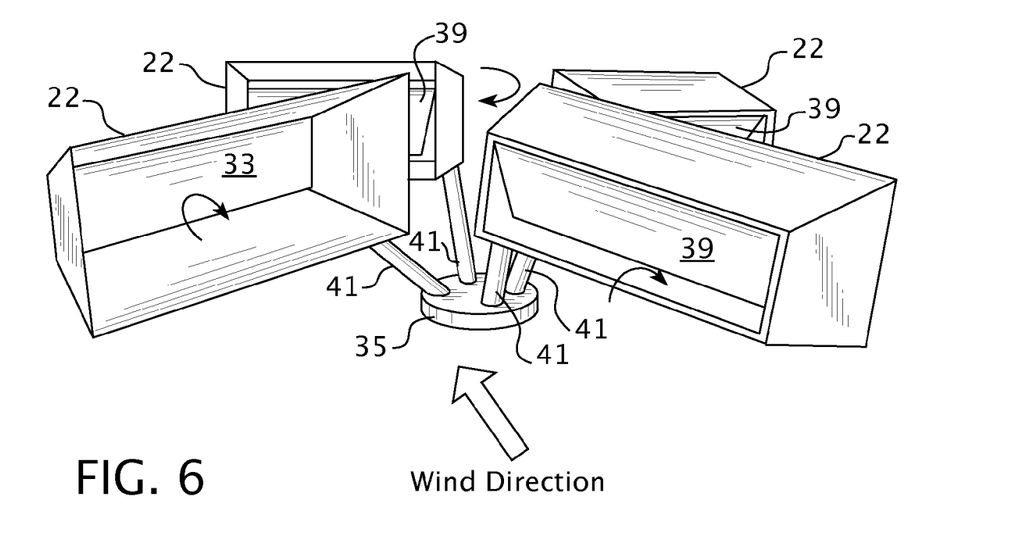
FIG. 6 is a perspective schematic showing just the four vanes, support arms and central disk to the FIG. 5 device.

FIG. 6 is a perspective schematic of a portion of FIG. 5 showing just the four vanes 22 and support arms 41 attached to a central disk 35. An arrow indicates the direction of wind flow against closed gravity-flap 33 and through openings created by raised gravity-flaps 39. The tapered sides of the vane funnel the wind and prevent it from easily escaping laterally. This allows the closed gravity-flap and vane structure to absorb wind energy for transmission to the rotating disk. Air and wind resistance on the rear surfaces of the other three vanes raise their gravity-flaps 39 and permit air flow through the rear openings in the vanes. This decreases drag or air/wind resistance on the rear surfaces of the vanes, thus increasing efficiency.

Figure 7:
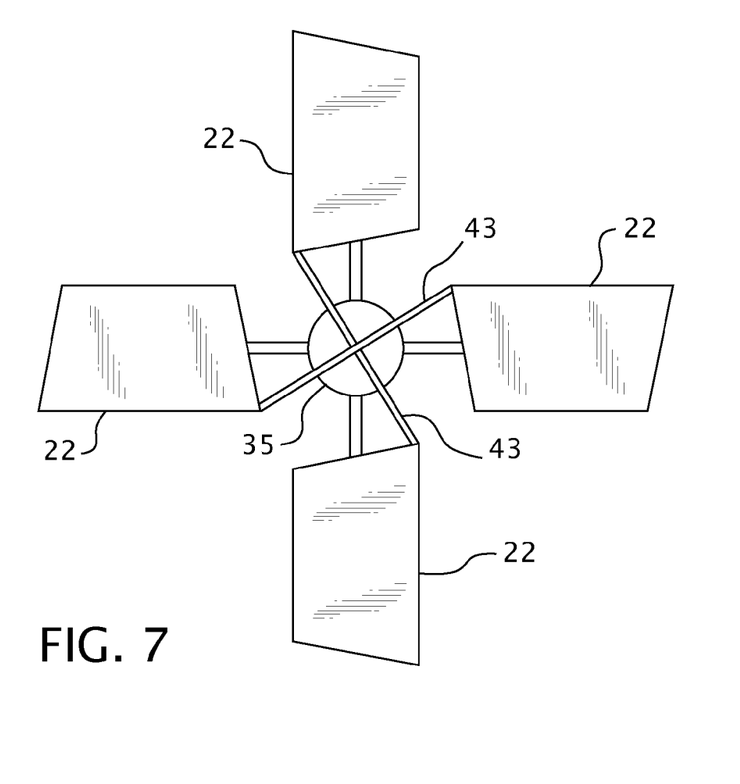
FIG. 7 is a top view schematic from above the device in FIG. 6.

FIG. 7 is a top view schematic from above the device in FIG. 6. This view shows how four vanes 22 are disposed symmetrically about central rotating disk 35. Crossing diagonally between opposed vanes are two support struts 43. While the preferred embodiment exhibits four opposed vanes, there is no reason that there could not be alternative embodiments with three or five vanes.

Figure 8:
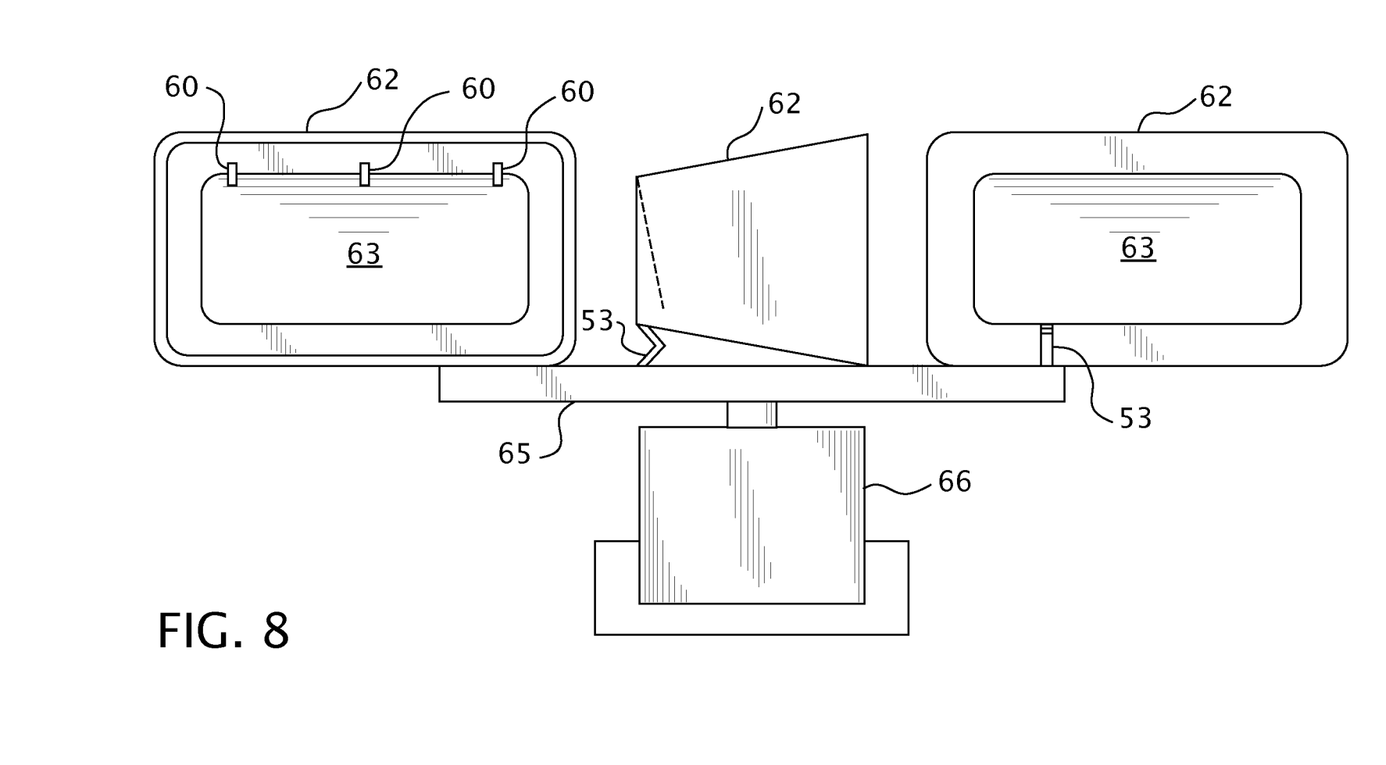
FIG. 8 is a front view, ground level schematic showing a third alternative embodiment of the parent invention in which the vanes are secured to a larger disk with additional supporting struts.

FIG. 8 is a front view, ground level schematic showing a third alternative embodiment in which four vanes 62 are secured to a larger circular disk 65 with additional supporting struts 53. That disk 65 attaches to a securely anchored, electrical generator 66. Depending on prevailing wind speed conditions and size of the apparatus, this embodiment may provide more stable rotation with stronger attachments between the vanes and the rotor than the FIG. 5 embodiment. Each vane 62 in FIG. 8 has its own gravity-flap 63 held onto the rear of each vane with a plurality of spaced apart hinges 60.

Figure 9:
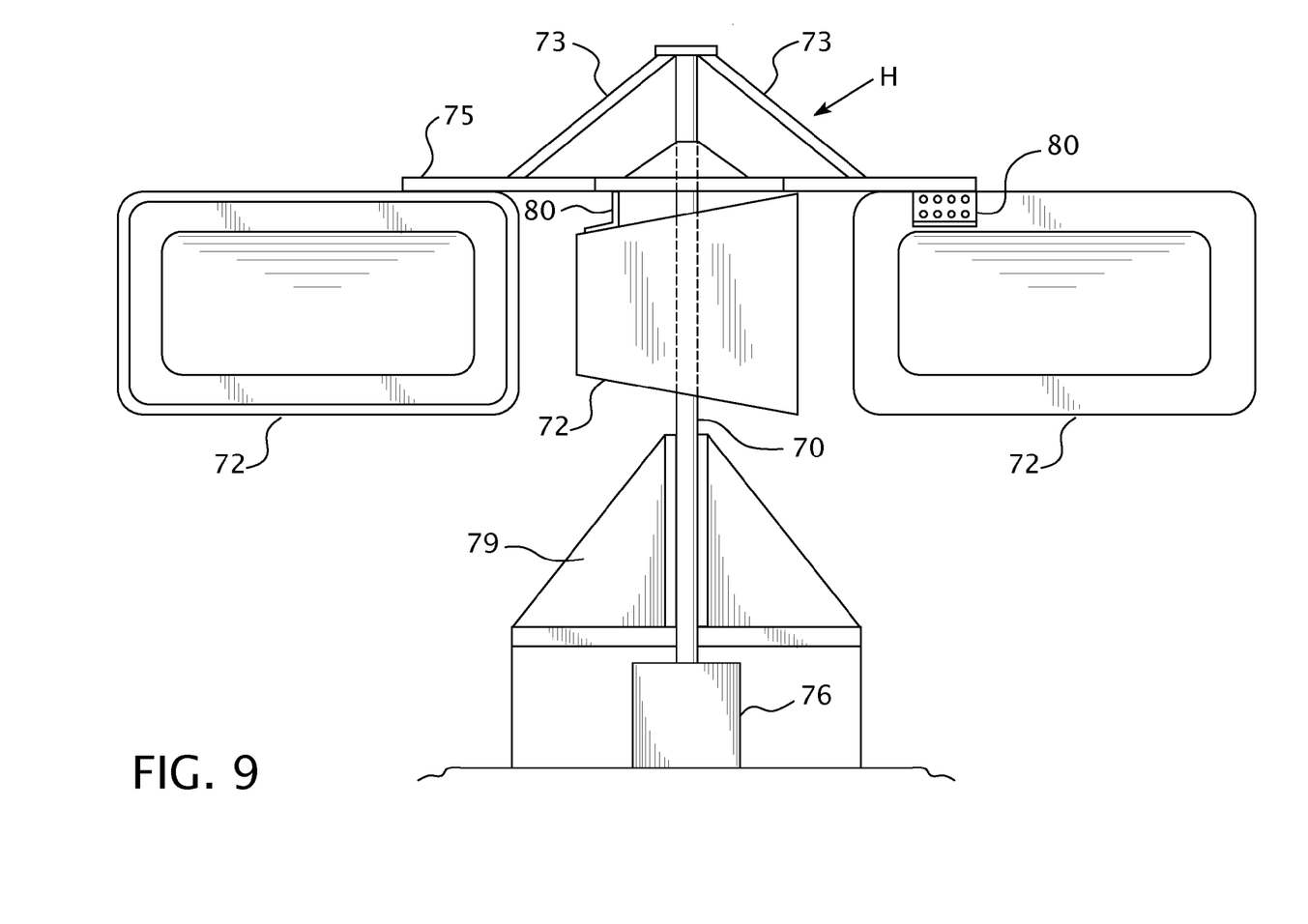
FIG. 9 is a front view, ground level schematic showing a fourth alternative embodiment of the parent invention in which the vanes (only three shown) connect to a circular disk, the central hub of which is securely fastened to an elongated vertical shaft partially enclosed at its base in a freely rotating housing, said shaft connected to an electrical generator or water pump.

FIG. 9 is a front view, ground level schematic of a fourth alternative embodiment wind turbine in which four vanes 72 (only three shown) connect to a top circular disk 75, the central hub of which securely fastens to an elongated vertical shaft 70. That shaft is partially enclosed at its base in a housing 79 in which it rotates freely, perhaps with ball or roller bearing units. The shaft continues through the base to turn an electrical generator or water pump 76. The hub H of disk 75 has angled supports to provide additional attachment strength and stability. There are also support struts 73 from the top of the vertical shaft 70 to disk 75. The housing 79 is sufficiently reinforced to support the superstructure even in extreme wind conditions. In addition, all seals for this embodiment should be covered and weatherproof. There are also additional support flanges 80 to attach the rotor vanes to the disk. This embodiment may be more suitable for large units in commercial wind farm installations.

Figure 10:
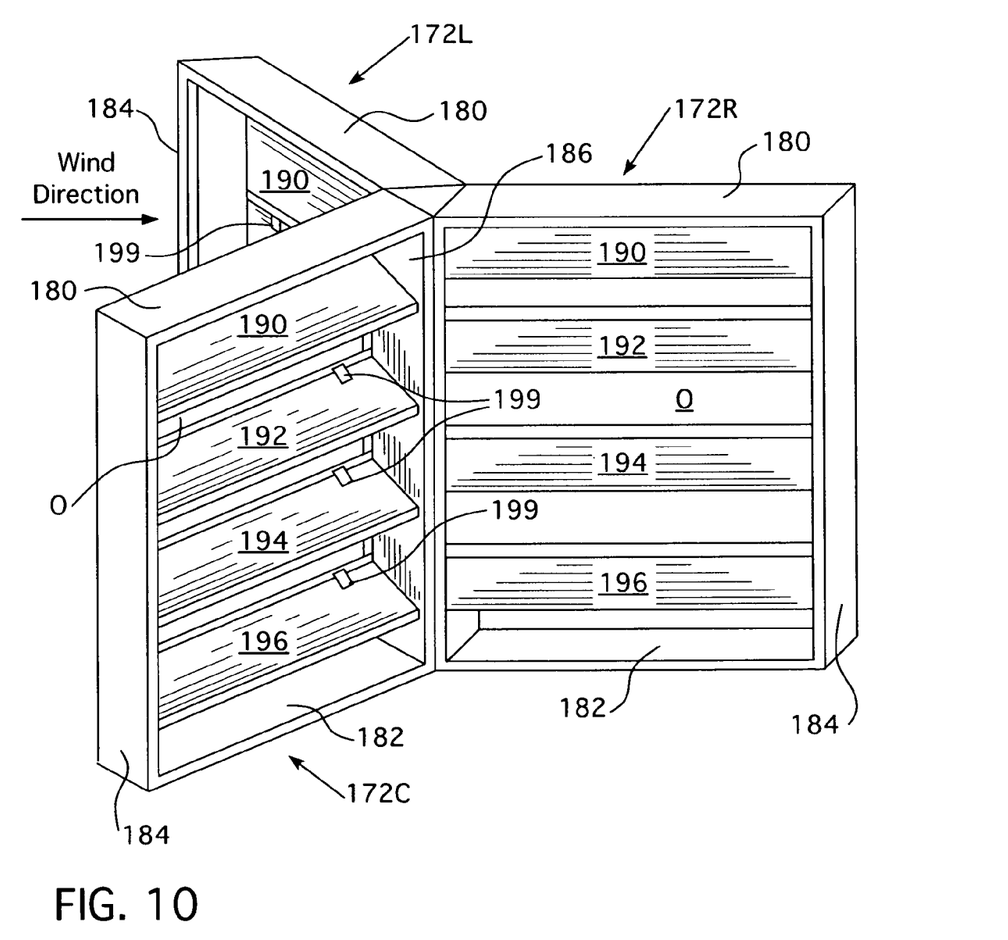
FIG. 10 is a top perspective view of one representative, multiple flap vane arrangement, with four flaps per vane as shown.

Latest Improvement:

All FIGS. of the original invention show a wind turbine with four vanes, each with two pairs of diametrically opposed vane sets. In FIG. 10, there is a representative turbine with an odd number of vanes . . . intentionally depicting three separate vane arrangements. It is to be understood that the present concept of multiple flaps PER VANE will also work on even-numbered vane combinations, of as many as four, six or even eight vane sets. Or, the invention would suffice with five or as many as seven (oddly numbered) vane sets in lesser preferred embodiments.

To the extent the FIGURE for the present invention, FIG. 10, has elements common to earlier embodiments, they will be commonly numbered though in the next hundred series. Particularly therein, FIG. 10 shows three representative vanes 172 with a left rear vane 172L, centermost vane 172C and right side vane 172R as shown, each roughly 120 degrees apart from their adjoining vane neighbor.

For each of the three vane "boxes" shown, there is a vane top 180, vane bottom 182, outer sidewall 184 and inner sidewall 186, with the inner sidewalls to each of three main vane elements being commonly joined together about a central vertical shaft (not visible in FIG. 10). Note that in accompanying FIG. 10, there is a slight upward slope to each vane top 180, as one moves from the vane rear R to vane front F. Alternatively, the vane tops may be made to extend substantially parallel to the respective vane bottoms.

For each respective vane opening O, there is a series of substantially horizontally-extending flaps, stacked one atop the other. In FIG. 10, for example, that embodiment shows a top flap 190, middle flaps 192, 194 and lowermost flap 196. Each flap is attached to the vane body proper with a plurality of swinging hinges 199. It is to be understood that still other flap connection means may be used to supplement, or completely substitute for hinges 199. In any event, these flap connection means allow for the upwardly flipping movement of each flap with the passage of wind through the respective vanes. While these vanes can be made of wood, metal, composites and/or other material blends, one suitable set of multiple flap configurations uses polymer-based materials, or plastics.

One major disadvantage of all known solar and wind electric generation systems is their dependence on a variable source of energy that does not often coincide with peak electricity demands. Energy storage systems are well known in the art, however. For example, U.S. Pat. Nos. 6,023,105 and 4,380,419 use wind turbines to drive water pumps rather than electric generators per se. The water from these systems can be pumped to a higher reservoir and then used to run hydroelectric generators via well understood technology. This allows control of the electric generation process to produce electricity when needed.

The parent invention is a safe, compact design that makes it highly suitable for transportation to and installation on many building rooftops. In addition, there is no reason why the electricity produced by such systems could not be diverted (wholly or partially) to other uses/needs. In the case of coastal seawater installations, some or all of the electricity could be used to run a desalinization plant. The resultant fresh water could have wind turbine pumping stations along a pipeline to carry it to areas of greater need. For tall building systems, the pumped and stored water could be used to supply the fresh water needs of that building and additional water electrically heated for the same building's hot water needs. The additional technologies involved, essentially water pump, water tank storage, and hydroelectric technologies are simple, well known and cost-effective.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A vertical axis wind turbine for storing energy, said wind turbine comprising:
    (a) a turbine rotor with a support platform, a rotatable vertical shaft extending from said platform, at least one bearing for said vertical shaft, and at least three rotor vanes disposed for rotation about the vertical shaft, each rotor vane having four solid sides, a front side and a rear side disposed in radial vertical planes, the front side being substantially open faced and the rear side having a rectangular opening surrounded by a support rim that connects to the rear of the four solid sides, said opening covered by a plurality of flaps joined to the rotor vane with a plurality of hinges, each of said flaps being capable of: moving about a horizontal axis of rotation with a directional passage of wind through the rotor vane; and preventing air from flowing through the rotor vane when forced against the support rim on the rear of the four solid sides; and
    (b) means for attaching each rotor vane to said vertical shaft so that the front side of each vane lies in the same rotational direction around said vertical shaft.

2. The energy storing wind turbine of claim 1, which contains an even number of vanes.

3. The energy storing wind turbine of claim 1, which contains an odd number of vanes.

4. The energy storing wind turbine of claim 1, wherein each vane contains an even number of flaps.

5. The energy storing wind turbine of claim 4, wherein each vane contains at least two flaps.

6. The energy storing wind turbine of claim 1, wherein each vane contains an odd number of flaps.

7. An improved vertical axis wind turbine for storing energy, said wind turbine comprising:
    (a) a turbine rotor with a support platform, a rotatable vertical shaft extending from said platform, at least one bearing for said vertical shaft, and at least three rotor vanes disposed for rotation about the vertical shaft, each rotor vane having four solid sides, a front side and a rear side, which front and rear sides are disposed in radial vertical planes, and the front side being substantially open faced and the rear side having a rectangular opening surrounded by a support rim that connects to the rear of the four solid sides, said opening covered by two or more flaps joined to the rotor vane with a plurality of hinges, each of said flaps being capable of: moving about a horizontal axis of rotation with a directional passage of wind through the rotor vane; and preventing air from flowing through the rotor vane when forced against: the support rim on the four solid sides; one or more hinges for the other flaps and combinations thereof; and
    (b) means for attaching each rotor vane to said vertical shaft so that the front side of each vane lies in the same rotational direction around said vertical shaft.

8. The energy storing wind turbine of claim 7, wherein each vane contains an even number of flaps.

9. The energy storing wind turbine of claim 7, wherein each vane contains an odd number of flaps.

10. In a vertical axis wind turbine that comprises:
    (a) a turbine rotor with a rotatable vertical shaft, at least one bearing for said vertical shaft, and three to five rotor vanes disposed symmetrically for rotation about the vertical shaft, each rotor vane being made from durable lightweight material and having four solid sides, and a front side, and a rear side disposed in radial vertical planes, the front side being substantially open faced and the rear side having a rectangular opening surrounded by a support rim that connects to a rear of the four solid sides; and (b) means for attaching each rotor vane to the vertical shaft so that the front side of each vane lies in the same clockwise or counter-clockwise direction around the vertical shaft, the improvement wherein:

the opening to the rear side of each rotor vane is covered by a plurality of stacked, rigid flaps that move about a horizontal axis of rotation to an open position with directional passage of wind through the rotor vane and to a closed position with the directional passage of wind against said rigid flaps, said closed position preventing air from flowing through said rigid flaps for said rotor vane.

11. The energy storing wind turbine of claim 10, wherein each vane contains an even number of flaps.

12. The energy storing wind turbine of claim 10, wherein each vane contains an odd number of flaps.

* * * * *